United States Patent [19]

Seki et al.

[11] Patent Number: 5,410,489
[45] Date of Patent: Apr. 25, 1995

[54] METHOD OF SPECIFYING POSITION TO CREATE FILLET CURVED SURFACE

[75] Inventors: Masaki Seki, Suginami; Osamu Hanaoka, Oshino, both of Japan

[73] Assignee: Fanuc Ltd., Yamanashi, Japan

[21] Appl. No.: 979,867

[22] PCT Filed: Jul. 6, 1992

[86] PCT No.: PCT/JP92/00854

§ 371 Date: Feb. 26, 1993

§ 102(e) Date: Feb. 26, 1993

[87] PCT Pub. No.: WO93/01535

PCT Pub. Date: Jan. 21, 1993

[30] Foreign Application Priority Data

Jul. 5, 1991 [JP] Japan ............... 3-191292

[51] Int. Cl.⁶ ............................................. G06F 15/46
[52] U.S. Cl. ............................ 364/474.29; 364/474.28
[58] Field of Search ................ 364/474.23, 474.26, 364/474.28, 474.29, 474.31

[56] References Cited

U.S. PATENT DOCUMENTS

| 3,866,179 | 2/1975 | McGee et al. | 364/474.29 |
| 4,855,926 | 8/1989 | Seki et al. | 364/474.29 |
| 4,855,927 | 8/1989 | Seki et al. | 364/474.29 |

FOREIGN PATENT DOCUMENTS

| 58-160041 | 9/1983 | Japan . |
| 63-250708 | 10/1988 | Japan . |
| 1-21505 | 1/1989 | Japan . |
| 2-210581 | 8/1990 | Japan . |
| 2-287888 | 11/1990 | Japan . |
| 3-118667 | 5/1991 | Japan . |

*Primary Examiner*—Roy N. Envall, Jr.
*Assistant Examiner*—Steven R. Garland
*Attorney, Agent, or Firm*—Staas & Halsey

[57] ABSTRACT

Disclosed is a method of specifying with a program language the location of a fillet to be created at the intersection of a compound curved surface. After the processings for inputting information on a curved surface and information for cutting the same (S1, S2) and calculating the curved surfaces (S3) have been completed, a system receives information on the alternative of inserting a concave fillet or inserting a convex fillet (S4). When the inputted information is for the concave fillet, based on the inputted information (S5), the system executes a predetermined calculation so as to create the concave fillet curved surface at the boundary between two curved surfaces, each on the side to which their respective normal vectors are directed (S6). On the other hand, when the input is the convex fillet, the system executes a predetermined calculation to create the convex fillet curved surface at the boundary between the two surfaces, each on the side opposite to the side to which their respective normal vectors are directed (S7).

2 Claims, 3 Drawing Sheets

5,410,489

METHOD OF SPECIFYING POSITION TO CREATE FILLET CURVED SURFACE

TECHNICAL FIELD

The present invention relates to a method of creating a free-form curved surface applicable to an automatic programming apparatus, which produces information data for cutting a free-form surface of a mold or the like. More particularly, the present invention relates to a method of specifying the position to create a fillet curved surface where an arc-like fillet surface (or a rounding surface) is to be created at the boundary (or the intersection) between two curved surfaces to constitute a compound curved surface.

BACKGROUND ART

A method of creating a fillet curved surface at the position where two free-form surfaces are joined together is disclosed in, for example, Japanese Patent Laid-open Publication Nos. 63-91705 and 63-129403.

On the other hand, in general, curved surface or NC data for cutting a free-form surface of a mold or the like is ordinarily, automatically prepared by a CAD/CAM system of, for example, an automatic programming apparatus. To this end, first, information on curved surfaces and then, information for cutting the same, must be applied to the system in the form of corresponding programming languages.

In this case, when a target free-form surface is a compound curved surface consisting of a plurality of curved surfaces, and when a fillet curved surface having a predetermined radius of curvature is required to be created for rounding machining at the boundary where one curved surface intersects another curved surface, the system must be loaded with the curved surface information, the cutting information, and fillet information for specifying the boundary to create the fillet and the radius of the arc to be inserted. As is clear from FIG. 3, however, four boundaries ((1) to (4) in the figure) can be considered to exist where one curved surface (first curved surface SS1) intersects another curved surface (second curved surface SS2). Therefore, by merely defining a boundary as the boundary formed between one curved surface and another curved surface, a particular boundary cannot be identified or specified. Further, the position for the insertion of the fillet cannot be specified. For this reason, an operator must designate any one particular boundary out of a plurality of boundaries, as the position to create the fillet. This one boundary will then be input to the system.

A typical conventional method of creating the fillet curved surface comprises the step of determining the vertical relationship (represented by z axis coordinate) between two curved surfaces, for defining the shift of a cutting path from one curved surface to another, is determined. Next, a radius of curvature of the fillet to be inserted into the space between the two curved surfaces for defining the shift of cutting path from one curved surface to another curved surface, is specified. As a result a compound curved surface, including a fillet curved surface, is able to be formed. More specifically, to shift the cutting path from a first curved surface to a second curved surface, parameters are used to specify whether the cutting path is to advance to the second curved surface lying above the first curved surface or, alternatively, to the second curved surface lying below the first curved surface. For example, with a parameter A, the cutting path is allowed to shift from the first curved surface to the second curved surface having the greater Z-axis coordinate value. With a parameter B, the cutting path is allowed to shift from the first curved surface to the second curved surface having the lesser Z-axis coordinate value. In addition to these parameters, however, a radius of the fillet curved surface should also be specified for transitioning from the one curved surface to the other curved surface.

These curved surfaces maybe, however, be arbitrarily defined in an XYZ rectangular coordinate system; hence it may be impossible to specify a particular boundary between the two curved surfaces by only a data change in the Z-coordinate values, depending on the manner in which the compound curved surface is defined.

Moreover, when the target compound curved surface is side cut machined causing the locus of the tool end is located on the same XY plane, no change in Z-axis coordinate values will be exhibited when the cutting path shifts from one curved surface to another curved surface. In such a case, specifying a particular boundary between the two surfaces by the above-described conventional method is impossible.

As described above, when producing NC data for creating a free-form surface, which includes a fillet curved surface, by using automatic programming apparatus, produced data may be useless, depending on the manner of defining a target curved surface, if the position to create the fillet is specified using a programming language by the conventional method.

DISCLOSURE OF THE INVENTION

The object of the present invention is to provide a method of easily specifying, with a program language the boundary between two curved surfaces into which the fillet is inserted from among a plurality of boundaries formed between two curved surfaces constituting a compound curved surface, when producing NC data for creating a free-form surface, including a fillet surface, using an automatic programming system.

To accomplish the above object, the present invention, in producing NC data for cutting a compound curved surface by the use of an apparatus for producing NC data, comprises the steps of inputting information which either inserts a concave fillet into the boundary between the two surfaces or inserts a convex fillet thereinto. The input information either specifies the concave fillet, instructing creation of the concave fillet at the boundary to which normal vectors of the two curved surfaces are both directed or the convex fillet, instructing creation of the convex fillet at the boundary to which neither normal vector of the two curved surfaces directed.

According to the present invention, as described above, the position where a fillet is provided on a compound curved surface obtained by joining a first and a second surfaces, each falling under different libraries, may be specified by a language, to consequently facilitate tile specification of the position to create tile fillet on the compound curved surface.

BEST MODE FOR CARRYING OUT THE INVENTION

The fillet curved surface is created by use of a cutting tool. The free-form surface is visually divided by a lattice, the intersections of the lattice denoting lattice points.

In general, the information (or NC data) for cutting a free-form surface includes a normal vector required for the execution of a tool diameter offset with respect to each of lattice points on the free-form surface. Therefore, by referring to the normal vector, the side of the free-form surface to which the normal vector points (hereinafter, referred to as the front) can be distinguished from the opposite side thereto (hereinafter, referred to as the reverse).

Figure 4A:
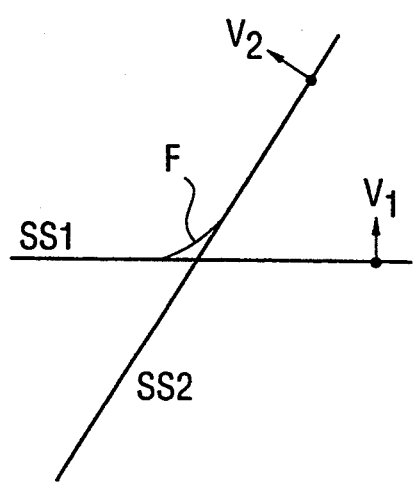
FIGS. 4a and 4b are conceptual diagrams illustrating a concave fillet and a convex fillet, respectively, being inserted into the boundary defined by two curved surfaces.
Figure 4B:
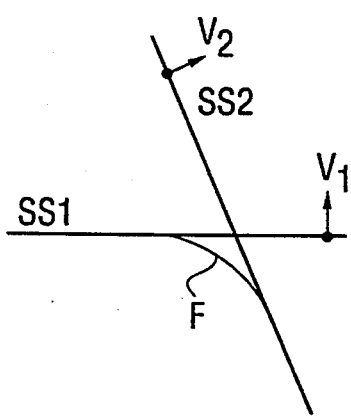

Assume a compound curved surface consisting of a first curved surface SS1, having an upwardly directed normal vector V1, and a second curved surface SS2, extending through a transition rightwardly from the first curved surface SS1, as shown in FIGS. 4a and 4b. A fillet F is to be created at a position shown in either FIG. 4a or FIG. 4b, depending on the direction of a normal vector V2 of the second curved surface SS2. More specifically, the position to create the fillet F is limited to either a boundary defined by the front side of the curved surface SS1 and the front side of the curved surface SS2 as shown in FIG. 4a, or a boundary defined by the reverse side of the curved surface SS1 and the reverse side of the curved surface SS2 as shown in FIG. 4b. Thus, the fillet F presents a concave surface in the case of FIG. 4a, whereas it presents a convex surface in the case of FIG. 4b.

As is apparent from the foregoing, when inserting the fillet F into such a compound curved surface, the concave fillet is specified for the boundary as shown in FIG. 4a, that is, the boundary defined by the front side of one curved surface and the front side of the other curved surface. The convex fillet is specified for the boundary as shown in FIG. 4b, that is, the boundary defined by the reverse side of one curved surface and the reverse side of the other curved surface.

Hence, in a method of the present invention, a system first receives information on the alternative of inserting the concave fillet or inserting the convex fillet; in other words, information on which of the concave surface or the convex surface is to be formed at the boundary between two curved surfaces to create the fillet. Providing that the input is for a concave surface, the system executes a predetermined calculation, based on the inputted information, such that a fillet curved surface is created at the boundary between two curved surfaces, each on the side to which their respective normal vectors are directed (or on the reverse side of the two curved surfaces). Alternatively, providing that the input is for a convex surface, the system executes a predetermined calculation such that the fillet curved surface is created at the boundary between two curved surfaces on the side opposite to the side pointed by their respective normal vectors (or on the front side of the two curved surfaces).

Figure 2:
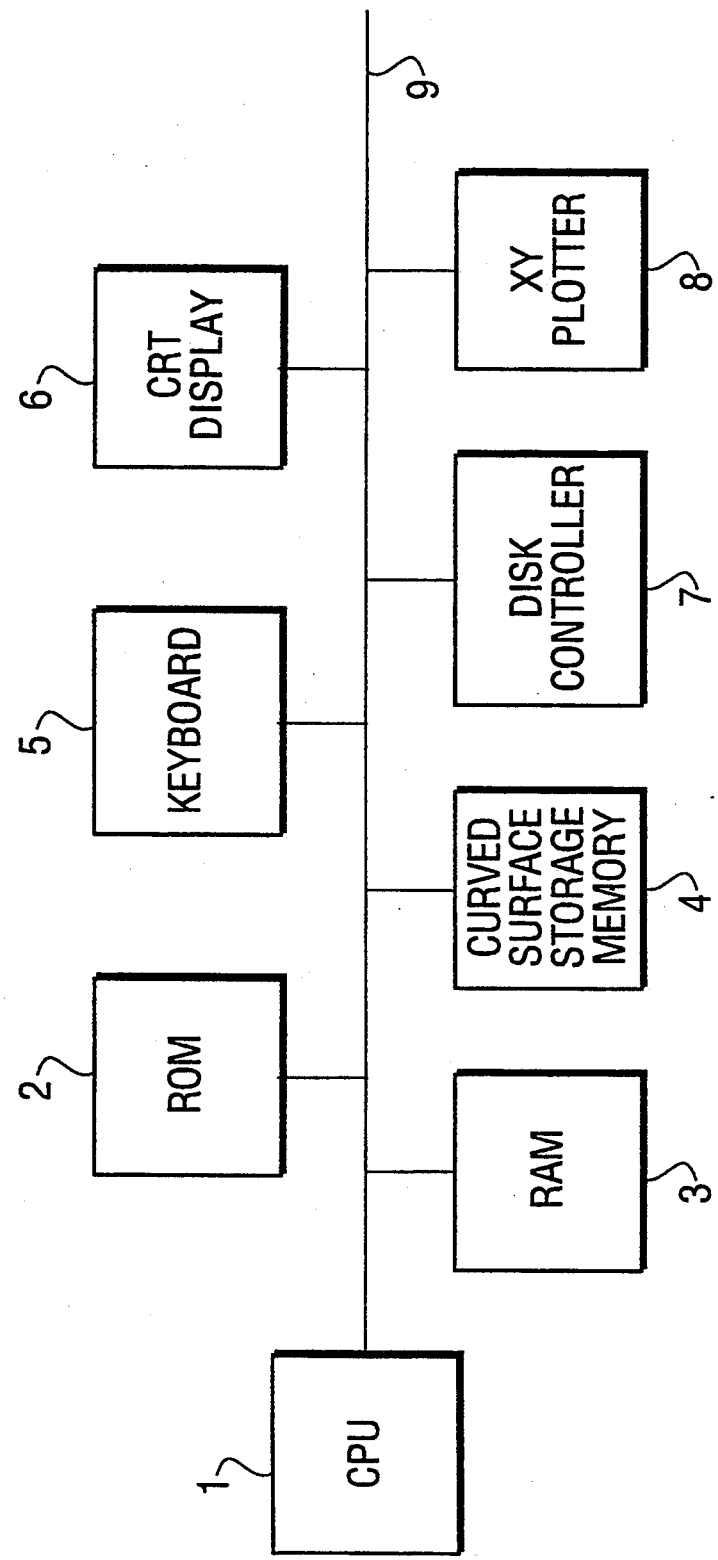
FIG. 2 is a block diagram illustrating the principal part of an automatic programming apparatus which is an embodiment for practicing the method of the present invention.
Figure 3:
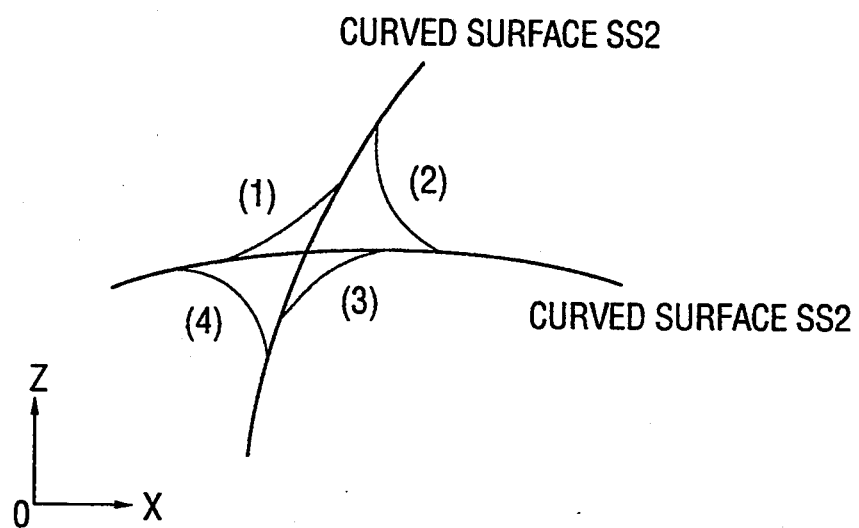
FIG. 3 illustrates four boundaries where one curved surface intersects another curved surface.

FIG. 2 is a block diagram illustrating a principal part of an automatic programming apparatus as an embodiment for practicing a method in accordance with the present invention. In this figure, reference numeral 1 denotes a processor (CPU) coupled through a bus 9 to a ROM 2 for storing a control program; a RAM 3 for use in, for example, temporarily storing a system program input from a floppy disk (not shown) by way of a disk controller 7 and data for various operations; a curved surface storage memory 4 for storing various curved surface data (or NC data) for machining the curved surface; a keyboard 5; a graphic display (CRT display unit) 6; the disk controller 7; and an XY plotter 8 for plotting a curved surface.

Figure 1:
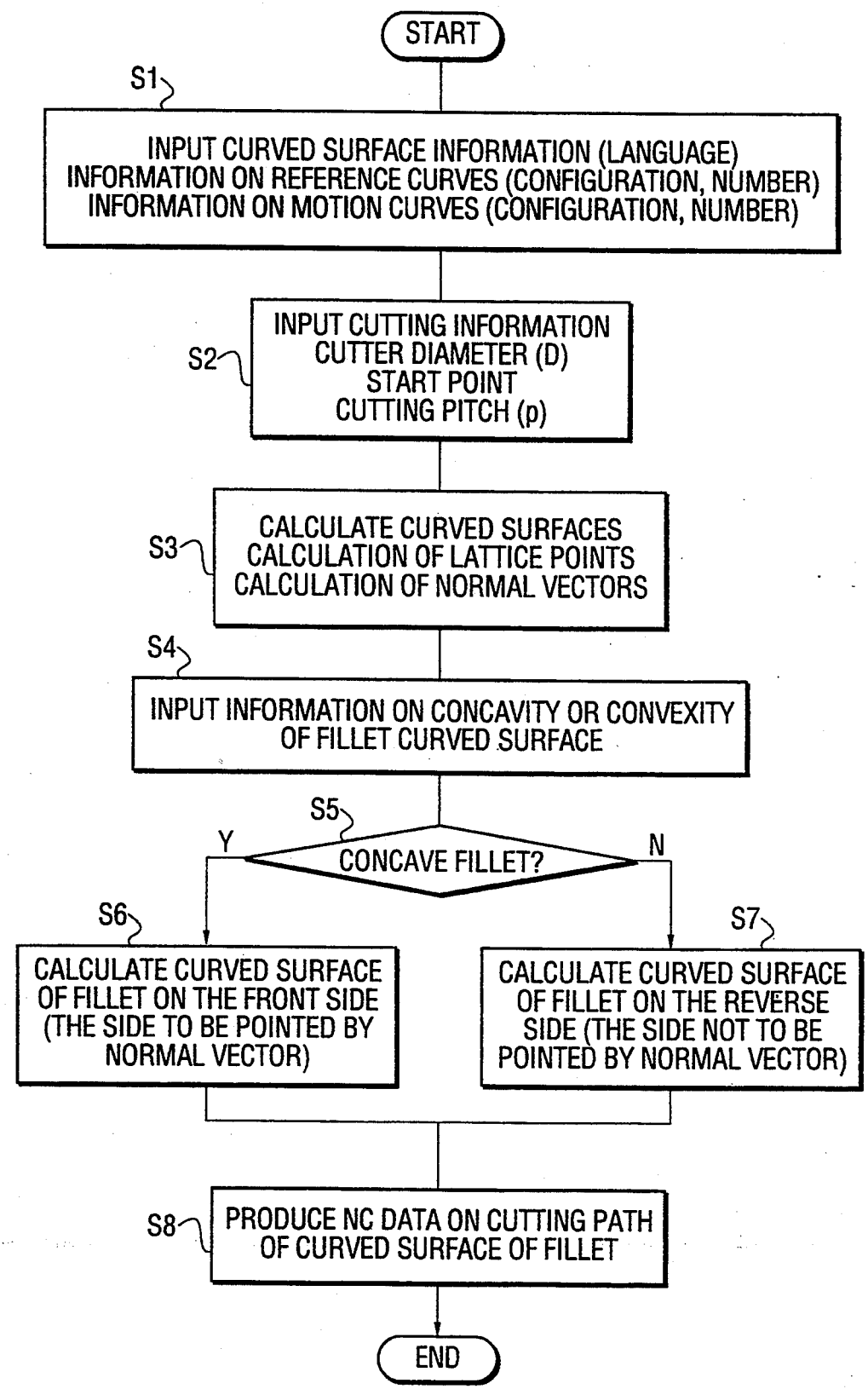
FIG. 1 is a flowchart illustrating a series of processings for specifying the position to create a fillet curved surface in accordance with an embodiment of the present invention.

A method of specifying a position to create a fillet curved surface according to an embodiment of the present invention will next be described with reference to a flowchart shown in FIG. 1.

First, through the disk controller or the keyboard 5, the operator inputs curved surface information on a compound curved surface. (Step S1) The curved surface information consists of a first curved surface SS1 and a second curved surface SS2, already, prepared and stored in the floppy disk or the like. Additionally, the operator inputs cutting information, for cutting the compound curved surface into the system for the storage within the RAM (Steps S2).

The curved surface information includes data for specifying the first curved surface SS1 and the second curved surface SS2, data (configuration and number) on reference curves, and data (configuration and number) on motion curves, which constitute the compound curved surface by being joined. The cutting information includes data on the diameter of a tool (cutter) to be used, a cutting start point, a cutting pitch and others.

Upon inputting the information on a target compound curved surface and the cutting information, the processor 1 separately finds, in a conventional manner, numbers the of partitions of reference curves and motion curves based on the cutting pitch set for the present compound curved surface. The processor then determines three-dimensional coordinate locations of a plurality of points of intersection, (or lattice points) obtained by dividing the reference curves and the motion curves by their respective numbers of partitions. Then the processor establishes normal vectors of the lattice points for storage in a file within the RAM 3 (Step S3).

Through the keyboard 5, the system is supplied, by operator, with the information on the alternative of inserting the concave fillet or inserting the convex fillet (Step S4).

If the operator inputs concave fillet information in Step 4 (Step S5), the boundary to create the fillet is defined as the boundary extending between the first curved surface SS1, on the side to which its normal vector is directed, and the second curved surface SS2, on the side to which its normal vector is directed. As a result the position where the fillet is to be created is specified, and the obtained information is input to the RAM in the form of a language. The processor 1 then performs a calculation for creating a fillet curved surface at the specified boundary in accordance with the program stored in the RAM (Step S6).

Alternatively, if the operators input convex surface fillet information in the Step S4 (Step S5), the boundary to create the fillet is defined as the boundary extending between the first curved surface SS1, opposite to the side pointed by its normal vector, and the second curved surface SS2, opposite to the side pointed by its normal vector. As a result the position where the fillet is to be created is specified, and the obtained information is loaded into the RAM 3 in the form of a language. Consequently, as in the previous case, the processor 1 executes a calculation for creating a fillet curved surface having a predetermined radius at the specified boundary in accordance with the program stored in the RAM 3 (Step S7).

When the calculation to create the fillet curved surface is made, in either Step S6 or Step S7 at the predetermined position as described above, the processor 1 produces NC data on cutting path on the fillet curved surface (Step S8). Thus NC data are stored in the curved surface storage memory 4 to bring this process to an end.

What is claimed is:

1. A method of specifying, using a computer and program language, a position for a cutting tool to create a fillet curved surface at a boundary defined between two curved surfaces of a compound curved surface, by producing numerical control data for cutting the compound curved surface using an apparatus which generates said numerical control data, said method comprising the steps of:

inputting, to said computer, input information for inserting one of a concave fillet and a convex fillet into said boundary between said two curved surfaces, and a normal vector for each curved surface;

instructing said cutting tool to create said concave fillet at the boundary, between said two curved surfaces where said normal vectors of said two curved surfaces are both directed when said input information specifies said concave fillet; and instructing said cutting tool between said two curved surfaces where said two curved surfaces intersect, to create said convex fillet at a boundary between said two curved surfaces, where neither of said normal vectors of said two curved surfaces is directed when said input information specifies said convex fillet.

2. A method of specifying a position to create a fillet curved surface at a boundary defined between two curved surfaces of a compound curved surface, by producing numerical control data for cutting the compound curved surface using an apparatus which generates said numerical control data, said method comprising the steps of;

finding lattice points of the compound curved surface, through which a cutting tool passes, and normal vectors of said lattice points, based on input curved surface information and cutting information input to said apparatus;

inputting, to said computer, input information for one of inserting a concave fillet and inserting a convex fillet into the boundary defined between said two curved surfaces;

instructing said cutting tool to create said concave fillet at the boundary to which normal vectors of said two curved surfaces are both directed when said input information specifies a concave fillet; and instructing said cutting tool to create said convex fillet into the boundary defined by two curved surfaces to which neither of said normal vectors of said two curved surfaces are directed when said input information specifies a convex fillet.

* * * * *

UNITED STATES PATENT AND TRADEMARK OFFICE
CERTIFICATE OF CORRECTION

PATENT NO. : 5,410,489
DATED : April 25, 1995
INVENTOR(S) : Masaki SEKI, et al.

It is certified that error appears in the above-indentified patent and that said Letters Patent is hereby corrected as shown below:

Col. 1, line 9, before "data", insert --[NC]--;
  Line 59, after "faces", insert a comma (",");
  Line 61, after "result", insert a comma (",").

Col. 2, line 8, delete "the";
  Line 10, delete "maybe" and insert therefor --may be--;
  Line 12, after "hence", insert a comma (",");
  Line 18, delete "is", second occurrence, and insert therefor --to be--;
  Line 36, after "language", insert a comma (",");
  Line 39, after "between", insert --the--;
  Line 54, after "surfaces", insert --is--;
  Line 61, delete "tile", both occurrences, and insert therefor --the--;

Col. 4, line 26, after "already", delete the comma (",");
  Line 41, after "manner", insert --the--;
  Line 42, delete "the";
  Line 51, after "by", insert --the--;
  Line 52, delete "the", first occurrence;
  Line 68, delete "the", first occurrence.

Signed and Sealed this

Eleventh Day of July, 1995

Attest:

BRUCE LEHMAN

Attesting Officer    Commissioner of Patents and Trademarks